US006859349B2

(12) United States Patent
Barna

(10) Patent No.: US 6,859,349 B2
(45) Date of Patent: Feb. 22, 2005

(54) COMBINATION POWER CIRCUIT LIGHT CODING SYSTEM

(75) Inventor: Joseph A. Barna, Marietta, GA (US)

(73) Assignee: Computer Data Exchange Services, Marietta, GA (US)

( * ) Notice: Subject to any disclaimer, the term of this patent is extended or adjusted under 35 U.S.C. 154(b) by 257 days.

(21) Appl. No.: 10/294,510

(22) Filed: Nov. 14, 2002

(65) Prior Publication Data

US 2003/0090920 A1 May 15, 2003

Related U.S. Application Data

(60) Provisional application No. 60/333,250, filed on Nov. 14, 2001.

(51) Int. Cl.$^{7}$ .................................................. H02H 3/00

(52) U.S. Cl. .......................................... 361/42; 340/654

(58) Field of Search .............................. 361/42, 45, 46, 361/111, 117, 118, 93.1, 93.3, 93.4; 307/126, 150; 324/556; 340/568.3, 568.4, 635, 641, 649, 654

(56) References Cited

U.S. PATENT DOCUMENTS

| | | | | |
|---|---|---|---|---|
| 4,571,531 | A | | 2/1986 | Lin |
| 4,583,086 | A | | 4/1986 | Andrews et al. |
| 4,853,821 | A | * | 8/1989 | Lewis ......................... 361/92 |
| 5,017,837 | A | | 5/1991 | Hanna et al. |
| 5,434,558 | A | | 7/1995 | Zeder |
| 5,485,356 | A | | 1/1996 | Nguyen |
| 5,510,773 | A | | 4/1996 | Rodgers |
| 5,608,328 | A | | 3/1997 | Sanderson |
| 5,629,826 | A | | 5/1997 | Roca et al. |
| 5,644,462 | A | * | 7/1997 | Boschetto et al. ......... 361/91.5 |
| 5,649,839 | A | | 7/1997 | Yu |
| 5,657,841 | A | | 8/1997 | Morvan |
| 5,680,052 | A | | 10/1997 | Tomari et al. |
| 5,697,717 | A | | 12/1997 | Kaneko et al. |
| 5,708,554 | A | | 1/1998 | Liner |
| 5,710,513 | A | | 1/1998 | March |
| 5,745,322 | A | | 4/1998 | Duffy et al. |
| 5,754,383 | A | | 5/1998 | Huppertz et al. |
| 5,788,521 | A | | 8/1998 | Milan |
| 5,835,326 | A | | 11/1998 | Callaway |
| 5,847,913 | A | | 12/1998 | Turner et al. |
| 5,894,392 | A | | 4/1999 | McDonald |
| 5,900,804 | A | | 5/1999 | Yewell |
| 5,912,514 | A | | 6/1999 | Stendardo et al. |
| 5,946,180 | A | | 8/1999 | Simpson |
| 5,956,223 | A | | 9/1999 | Banting |
| 5,962,932 | A | * | 10/1999 | Matlo ......................... 307/126 |
| 6,031,700 | A | | 2/2000 | Yang |
| 6,032,209 | A | | 2/2000 | Mros et al. |
| 6,049,143 | A | | 4/2000 | Simpson et al. |
| 6,104,289 | A | | 8/2000 | Rand |
| 6,104,302 | A | | 8/2000 | Vuong |
| 6,104,307 | A | | 8/2000 | Hanratty |
| 6,315,604 | B1 | | 11/2001 | Lee |
| 2001/0008414 | A1 | | 7/2001 | Kobayashi et al. |

FOREIGN PATENT DOCUMENTS

| | | | |
|---|---|---|---|
| WO | WO 00/39828 | 7/2000 | .......... H01H/35/00 |

* cited by examiner

*Primary Examiner*—Ronald Leja
(74) *Attorney, Agent, or Firm*—Kilpatrick Stockton

(57) ABSTRACT

Systems, methods, and apparatuses for isolating an electrical problem in a power pack include a system in accordance with various embodiments of the invention. The system includes a power pack. The power pack includes an input cord including at least a first indicator, wherein the input cord is adapted to receive electrical current from an electrical source, and further adapted to transmit the electrical current to the power pack, and wherein the first indicator indicates when the input cord transmits electrical current from the electrical source. The power pack also includes a housing including at least a second indicator, wherein the second indicator indicates when the power pack receives electrical current from the input cord. The power pack further includes a device cord adapted to conduct electrical current from the power pack to an electrically-powered device, the device cord including at least a third indicator, wherein the third indicator indicates when the power pack transmits electrical current through the device cord.

20 Claims, 3 Drawing Sheets

COMBINATION POWER CIRCUIT LIGHT CODING SYSTEM

CROSS-REFERENCE TO RELATED APPLICATIONS

This application claims priority to U.S. provisional patent application No. 60/333,250, filed Nov. 14, 2001, which is incorporated herein by reference.

FIELD OF THE INVENTION

The invention relates in general to electronic diagnostic equipment, and relates more particularly to systems, methods, and apparatuses for identifying the location of an electrical problem in a power pack for an electrically-powered device.

BACKGROUND OF THE INVENTION

A conventional power transformer pack is also known as a "power pack" or "power supply." An input cord or input power supply cord plugs into a conventional electrical AC outlet, and supplies electrical current to a power pack. The power pack transforms the electrical current to usable electrical current for an electrically-powered device. Some power packs may have a circuit breaker or a ground fault interrupt circuit built into the power pack. An output cord or device power supply cable conducts the usable electrical current from the power pack to an electrically-powered device such as a computer peripheral.

One problem with conventional power packs is the lack of isolation of one or more electrical power problems that can arise in a component part of the power pack. For example, if an electrically-powered device such as a computer peripheral being powered by the power pack suddenly loses power, it is not immediately apparent whether the problem is with the electrical source into which an input power supply cable is plugged, the electrical source itself, the power pack, an associated circuit breaker or ground fault interrupt circuit within the power pack, a device power supply cable, or the electrically-powered device being powered.

Typically, when an electrical problem arises, the troubleshooting for an electrically-powered device and its power supply can be a difficult and expensive task. Vendor service personnel contacted via telephone can be hindered by the lack of information supplied by the customer. For example, in the instance of a printer connected to a electrical source via a power pack, usually a customer will attempt to describe a problem in the printer or power pack to the vendor service personnel. In some instances, the customer's description of an electrical problem incorrectly attributes the problem to either the printer or the power pack. In most instances, only the vendor service personnel can isolate a specific problem in the printer or the power pack. When the problem cannot be isolated because the vendor service personnel cannot specifically analyze the printer and power pack, a new printer and/or power pack must be sent to the customer. However, shipping costs as well as replacement part costs can be very expensive.

In some cases, it is ultimately determined by vendor service personnel that there is no problem with the printer or the power pack received from the customer, but instead with a power cord between the printer and power pack, or the power cord between the power pack and the power source. In these cases, the problem has been initially misdiagnosed by the vendor service personnel because of the customer's lack of information. However, the burden of additional shipping and replacement part costs has already been incurred.

Therefore, a need exists for systems, methods, and apparatuses for isolating an electrical problem in a power pack. Furthermore, a need exists for systems, methods, and apparatuses for isolating an electrical problem in a power pack associated with an electrically-powered device. Moreover, a need exists for systems, methods, and apparatuses for diagnosing an electrical problem in a power pack. A need also exists for systems, methods, and apparatuses for diagnosing an electrical problem in a power pack associated with an electrically-powered device.

Furthermore, a need exists for systems, methods, and apparatuses for identifying the location of an electrical problem in a power pack associated with an electrically-powered device.

SUMMARY OF THE INVENTION

The above problems are solved by various embodiments of the invention. Systems, methods, and apparatuses according to various embodiments of the invention provide identification, isolation, and diagnosis of electrical problems in a power pack for an electrically-powered device.

Systems, methods, and apparatuses for isolating an electrical problem in a power pack include a system in accordance with various embodiments of the invention. The system includes a power pack. The power pack includes an input cord including at least a first indicator, wherein the input cord is adapted to receive electrical current from an electrical source, and further adapted to transmit the electrical current to the power pack, and wherein the first indicator indicates when the input cord transmits electrical current from the electrical source. The power pack also includes a housing including at least a second indicator, wherein the second indicator indicates when the power pack receives electrical current from the input cord. The power pack further includes a device cord adapted to conduct electrical current from the power pack to an electrically-powered device, the device cord including at least a third indicator, wherein the third indicator indicates when the power pack transmits electrical current through the device cord.

Systems, methods, and apparatuses for isolating an electrical problem in a power pack include a method in accordance with various embodiments of the invention. The method includes providing a power pack. The power pack includes a housing with at least a first indicator. The power pack also includes a power input cord including at least a second indicator. The power pack further includes a power output cord including at least a third indicator. The method also includes in the event of an electrical problem in the housing, providing an indication of the problem with the first indicator. The method further includes in the event of an electrical problem in the power input cord, providing an indication of the electrical problem with the second indicator. Further, the method includes in the event of an electrical problem in the power output cord, providing an indication of the electrical problem with the third indicator.

Systems, methods, and apparatuses for diagnosing an electrical problem in a power pack include a combination power light code apparatus for identifying the location of an electrical problem in a power pack. The apparatus includes a housing for transforming electrical current for use by a peripheral device, wherein the housing includes an first indicator providing an indication of whether electrical current is received by the housing. The apparatus includes an input power cord adapted to transmit electrical current to the housing, wherein the input power cord includes a second indicator providing an indication of whether electrical current is received by the input power cord. The apparatus further includes an output power cord adapted to transmit power from the housing to the peripheral device, wherein the output power cord includes a third indicator providing an indication of whether electrical current is received by the output power cord.

Objects, features and advantages of various systems and processes according to various embodiments of the invention include:

(1) Providing systems, methods, and apparatuses for isolating an electrical problem in a power pack;

(2) Providing systems, methods, and apparatuses for diagnosing an electrical problem in a power pack; and (3) Providing a combination power light code apparatus for identifying the location of an electrical problem in a power pack.

Other objects, features and advantages will become apparent with respect to the remainder of this document.

DETAILED DESCRIPTION OF EMBODIMENTS

Figure 1:
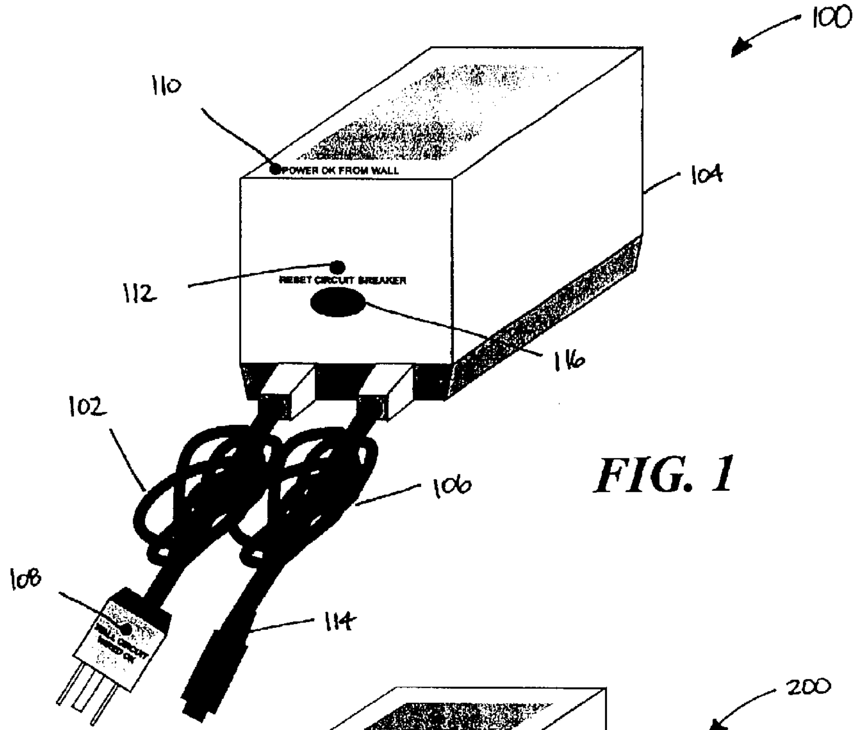
FIG. 1 is a system in accordance with various embodiments of the invention.

FIG. 1 is a system in accordance with various embodiments of the invention. The system 100 is a combination power circuit light coding system or device. Typically, the system 100 is utilized as a power transformer for an electrically-powered device such as a printer or other type of computer peripheral device. The system 100 is adapted to transfer electrical current from an electrical source, and is further adapted to transform an electrical current to usable electrical power for an electrically-powered device such as a printer or other type of computer peripheral device. In most cases, the electrical source is a conventional electrical outlet that provides a 120 VAC electrical current, such as standard household electrical outlet. The system 100 usually steps down the electrical current to a usable electrical power amount for an electrically-powered device. The system 100 includes an input cord 102, a housing 104, and an output cord 106. A combination or series of indicators 108-114 mount to a respective component 102–106 of the system 100. The housing 104 can also include a reset button 116 for an associated circuit breaker.

An individual component 102–106 may have one or more indicators 108–114. For example, a first indicator 108 mounts to the input cord 102. A second indicator 110 and third indicator 112 both mount to the housing 104. A fourth indicator 114 mounts to the output cord 106. Note that the designation of each indicator as "first," "second," "third," or "fourth" in the following description is not intended to be limiting but merely descriptive of the embodiment shown. A lesser number or greater number of indicators may be used in other embodiments of the invention.

The series of indicators 108–114 provide a user with the ability to identify and/or diagnose the existence of an electrical problem in a component of the system 100. For instance, when the input cord 102 connects to an electrical source, such as a household electrical outlet, and receives an electrical current from the source, a first indicator 108 provides an immediate indication of whether electrical current is transmitted from the electrical source to the input cord 108. In the event that the electrical source is faulty and no current is received by the input cord 108, the first indicator 108 provides an immediate indication that no electrical current is being transmitted from the electrical source to the input cord 108. Similarly, the second indicator 110, third indicator 112, and fourth indicator 114 each provide an immediate indication when an electrical problem exists in a respective component 104–106 of the system 100, or alternatively, when sufficient electrical current is being transmitted through the respective component 104–106.

A series of indicators 108–114 mounted to various components 102–106 of a power transformer, such as the housing 104 and associated cords 102, 106, provides a user with a diagnostic view of any existing electrical problems in the system 100. When at least one indicator 108–114 indicates an electrical problem, a user can usually isolate the electrical problem to the respective component. The respective component can then be replaced or repaired relatively quickly since the component is immediately identified as a source of an electrical problem for the system 100.

Figure 2:
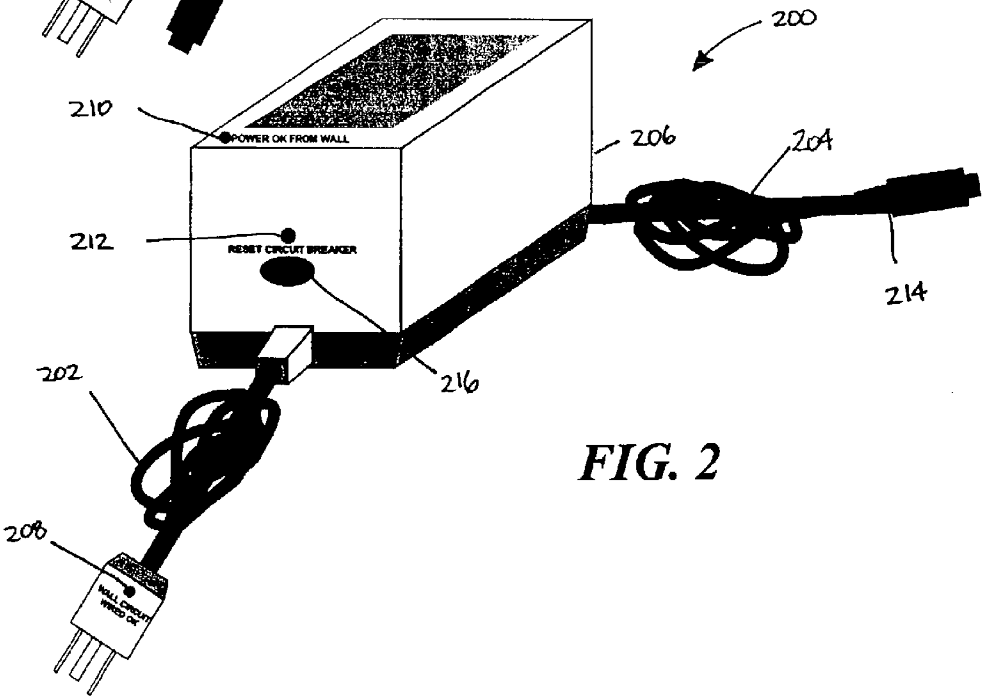
FIG. 2 is another system in accordance with various embodiments of the invention.

FIG. 2 is another system in accordance with various embodiments of the invention. The system 200 illustrated here shows another arrangement for an input cord 202 and output cord 204 relative to a housing 206. Indicators 208–214 are placed in similar locations as the indicators of FIG. 1. The housing 206 can also include a reset button 216 for an associated circuit breaker.

The embodiment shown operates in a substantially similar manner to the system 100 in FIG. 1. The alternate arrangement of the input cord 202 and output cord 204 with respect to the housing 206 demonstrates that various components of the system 200 can be arranged without significantly affecting operation of the system 200. Other arrangements for indicators 208–214 can also be provided without significantly affecting operation of the system 200.

Figure 3:
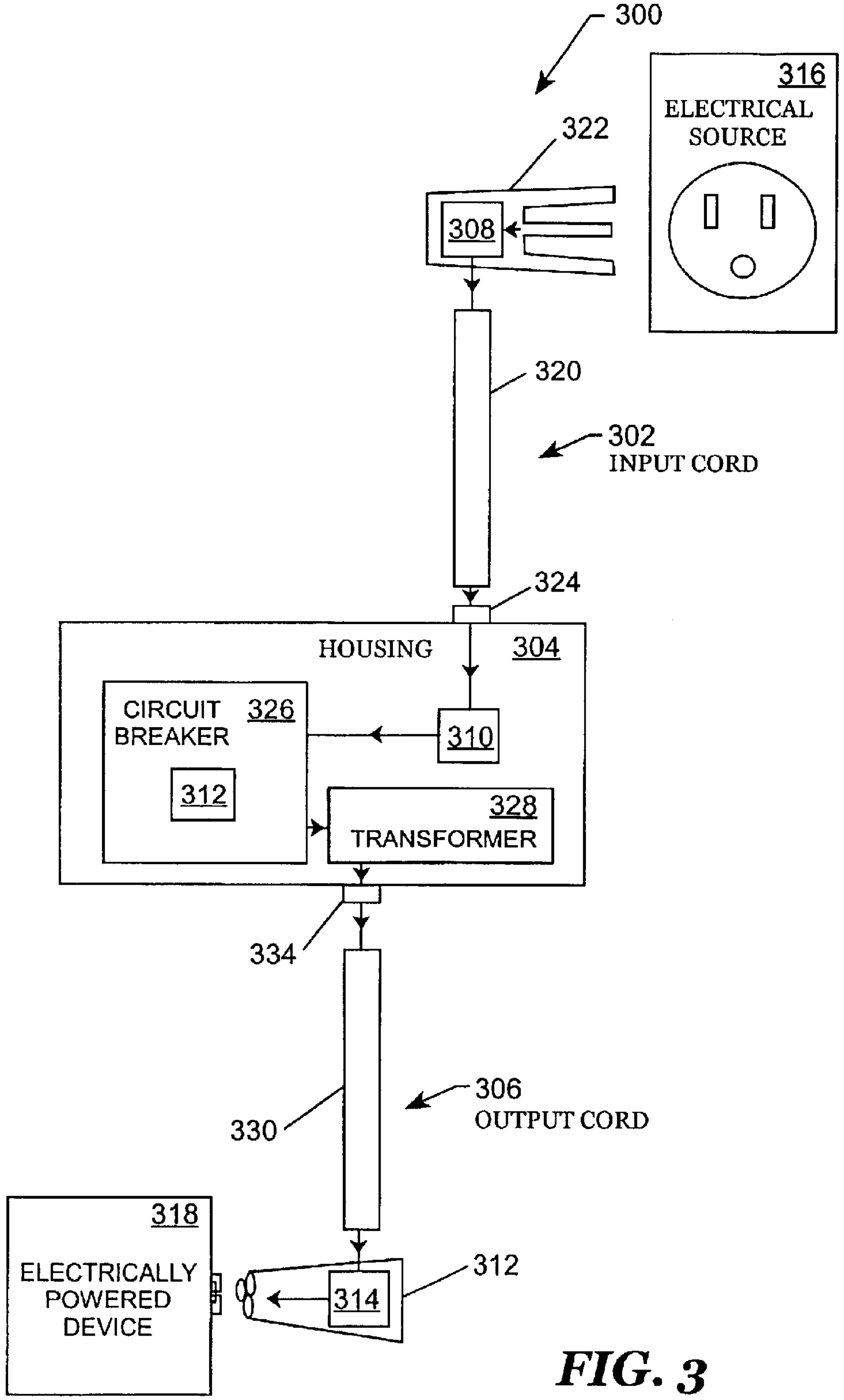
FIG. 3 is a functional block diagram of a system in accordance with various embodiments of the invention.

FIG. 3 is a functional block diagram of a system in accordance with various embodiments of the invention. The system 300 includes an input cord 302, a housing 304, an output cord 306, and a series of indicators 308–314 adapted to isolate an electrical problem in the system. Note that the designation of each indicator as "first," "second," "third," or "fourth" in the following description is not intended to be limiting but merely descriptive of the embodiment shown. A lesser number or greater number of indicators may be used in other embodiments of the invention.

The system 300 is adapted to receive electrical current from an electrical source 316 such as a conventional household electrical outlet, and further adapted to transform the electrical current to usable electrical power for an electrically-powered device 318 such as a printer or other type of computer peripheral device.

The input cord 302 includes a first indicator 308, an electrical cord body 320 with an electrical socket plug 322, and a housing adapter 324. The electrical cord body 320 extends between the housing 304 and the electrical source 316 to transmit electrical current from the electrical source 316 to the housing 304. Generally, the electrical cord body 322 is a conventional electrical cord that includes an insulated length of conductive electrical wiring for transmission of electrical current.

An electrical socket plug 322 can include at least one prong that corresponds with a opposing-shaped socket outlet associated with the electrical source 316. The electrical socket plug 322 is adapted to connect the electrical cord body 320 to the electrical source 316, and is further adapted to transmit electrical current from the electrical source to the electrical cord body 320. Generally, the electrical socket plug 322 is a conventional three prong electrical plug that fits into opposing prong-shaped openings of a conventional household electrical outlet.

The housing adapter 324 can be a plug that connects to a corresponding connection of the housing 304. The housing adapter 324 is adapted to connect the electrical cord body 322 to the housing 304, and is further adapted to transmit electrical current from the electrical cord body 320 to the housing 304. Generally, the housing adapter 324 is a plug that manually fits into opposing shaped opening of the housing 304.

The first indicator 308 is typically associated with the input cord 302. Typically, the first indicator 308 mounts to the electrical socket plug 322. The first indicator 308 can mount to other component parts of the input cord 302, such as the electrical cord body 320. In any configuration, the first indicator 308 provides an indication of whether a predefined amount of electrical current is received from the electrical source 316 when the electrical socket plug 322 is properly engaged with a corresponding socket of the electrical source 316. Typically, an indication provided by the first indicator 308 is independent of any other indication provided by other indicators 310–314. The first indicator 308 may be selectively sized or otherwise selected so that an indication provided by the first indicator 308 corresponds with a predefined amount of electrical current, or another desired electrical characteristic to be monitored.

For example, the first indicator 308 can be a light emitting diode (LED) that illuminates when electrical current is transmitted from the electrical source 316 and through the electrical socket plug 322. Alternatively, the first indicator or LED can be adapted to not illuminate when electrical current is not transmitted from the electrical source 316 and through the electrical socket plug 322. Other types of devices similar to a LED can be utilized as a first indicator.

The housing 304 is electrically connected between the input cord 302 and the output cord 306. The housing 304 includes a second indicator 310, a circuit breaker 326 with a third indicator 312, and a transformer 328. Typically, the housing 304 is a durable casing that encloses portions of the circuit breaker 326 and transformer 328. The second indicator 310 and third indicator 312 are mounted to the housing 304 so that each indicator 310, 312 can be observed by a user. Note that the components of the housing 304 may be arranged in an alternative order, or otherwise electrically wired in a different configuration than shown. Other components may also be included within the housing 304 or otherwise mounted to the housing 304.

The second indicator 310 provides an indication of whether electrical current is transmitted to the housing 304 through the electrical cord body 320 when the electrical socket plug 322 is properly engaged with a corresponding socket of the electrical source 316. Typically, an indication provided by the second indicator 310 is independent of any other indication provided by other indicators 308, 312–314. The second indicator 310 may be selectively sized or otherwise selected so that an indication provided by the second indicator 310 corresponds with a predefined amount of electrical current, or another desired electrical characteristic to be monitored.

For example, the second indicator 310 can be a light emitting diode (LED) that illuminates when electrical current is transmitted to the housing 304 through the electrical cord body 320. Alternatively, the second indicator 310 can be adapted to not illuminate when electrical current is not transmitted through the electrical cord body 316 to the housing 304. Other types of devices similar to a LED can be utilized as a second indicator.

The circuit breaker 326 mounts to the housing 304, and is usually located between the input cord 302 and the output cord 306. The circuit breaker 326 can be a conventional ground fault interrupter (GFI) circuit or another similar type of circuit breaker that detects an electrical condition such as an overcurrent condition. In the event of an overcurrent condition, the circuit breaker will trip, and the system 300 will not supply power to the electrically-powered device 318 thorough the output cord 306. When the overcurrent condition is removed, the circuit breaker 326 can be reset by depressing a reset button (not shown) accessible on the housing 304. The circuit breaker 326 may be selectively sized or otherwise selected so that the circuit breaker 326 trips or otherwise interrupts the flow of electrical current through the housing 304 when a predefined amount of electrical current, or another predefined amount of an electrical characteristic is detected.

The circuit breaker 326 includes a third indicator 312 that indicates when a predefined amount of electrical current is received by the circuit breaker 326 from the input cord 306. The third indicator 312 may be selectively sized or otherwise selected so that an indication provided by the third indicator 312 corresponds with a predefined amount of electrical current, or another desired electrical characteristic to be monitored. Typically, an indication provided by the third indicator 312 is independent of any other indication provided by other indicators 308–310, 314.

For example, the third indicator 312 can be a light emitting diode (LED) that illuminates when an overcurrent condition is detected by the circuit breaker 326. Alternatively, the third indicator 312 or LED does not illuminate when an acceptable amount of electrical current is received by the circuit breaker 326 from the input cord 306. Other types of devices similar to a LED can be utilized as a third indicator.

The transformer 328 mounts to the housing 304, and is located between the input cord 302 and the output cord 306. Typically, electrical current from the electrical source 316 reaches the circuit breaker 326 prior to the transformer 328. The transformer 328 can be a conventional transformer or another device that is adapted to step an electrical current from the electrical source 316 down to a usable amount of electrical current for the electrically-powered device 318. For example, a suitable transformer can step down 120 VAC to 22 VAC.

The output cord 306 includes a fourth indicator 314, an electrical cord body 330 with a device socket plug 332, and a housing adapter 334. The electrical cord body 330 extends between the housing 304 and the electrically-powered device 318 to transmit usable electrical current from the housing 304 to the electrically-powered device 318. Generally, the electrical cord body 330 is a conventional electrical cord that includes an insulated length of conductive electrical wiring for transmission of electrical current.

A device socket plug 332 can include at least one prong that corresponds with a prong-shaped outlet associated with the electrically-powered device 318. The device socket plug 332 is adapted to connect the electrical cord body 330 to the device socket plug 332. Generally, the device socket plug 332 is a plug that manually fits into opposing shaped opening of the electrically-powered device 318.

The housing adapter 334 connects the electrical cord body 330 to the housing 304. The housing adapter 334 can be a plug that manually connects to a corresponding plug-shaped opening of the housing 304, similar to the housing adapter 324 discussed above.

The fourth indicator 314 typically mounts to the device socket plug 332 to provide an indication of whether electrical current is received from the housing 304 when the electrical socket plug 322 is properly engaged with a corresponding socket of the electrical source 316. Generally, the fourth indicator 308 is a light emitting diode (LED) that illuminates when electrical current is transmitted from the housing 304 and through the device socket plug 332. Alternatively, the fourth indicator or LED does not illuminate when electrical current is not transmitted through the electrical cord body 330 and to the device socket plug 332. Typically, an indication provided by the fourth indicator 314 is independent of any other indication provided by other indicators 308–312. The fourth indicator 314 may be selectively sized or otherwise selected so that an indication provided by the fourth indicator 314 corresponds with a predefined amount of electrical current, or another desired electrical characteristic to be monitored. Other types of devices similar to a LED can be utilized as a fourth indicator.

The above system 300 is an improvement of conventional power transformers, power packs. The system 300 can be operated by initially connecting a input cord 302 between a housing 304 and an electrical source 316, such as a conventional household AC electrical outlet. This is accomplished by engaging the electrical socket plug 322 with a corresponding outlet for the electrical source 316. A housing adapter 324 at the opposing end of the input cord 302 is either pre-connected to the housing 304 or manually connected to the housing 304 via a corresponding socket (not shown) associated with the housing 304. When an electrical current from the electrical source 316 is detected by a first indicator 308 associated with the electrical socket plug 326, the first indicator 308 provides a positive indication, such as illuminating a LED. Typically, a positive indication provides feedback to a user that the electrical source 316 provides a sufficient amount or predetermined amount of electrical current to the input cord 302. If no electrical current is detected by the first indicator 308, then the first indicator 308 provides a negative indication, such as not illuminating a LED. Typically, a negative indication provides feedback to a user that the electrical source 316 is not providing a sufficient amount or predetermined amount of electrical current to the input cord 302. If the first indicator 308 provides a negative indication, then the electrical source 316 could be faulty.

When the housing 304 is electrically connected to the electrical source 316 via the input cord 302, a second indicator 310 can provide an indication of an electrical problem. When electrical current is detected by the second indicator 310, the second indicator 310 provides a positive indication, such as illuminating a LED. Typically, a positive indication is feedback to a user that a sufficient amount or predetermined amount of electrical current is being transmitted to the housing 304 through the input cord 302 from the electrical source 316. If no electrical current is detected by the second indicator 310, then the second indicator 310 provides a negative indication, such as not illuminating a LED. Typically, a negative indication is feedback that that an insufficient amount or no electrical current is being transmitted to the housing 304 through the input cord 302 from the electrical source 316. If a sufficient amount of electrical current is detected by the first indicator 308, and the second indicator 310 does not detect a sufficient amount of electrical current, then the input cord 302 could be faulty.

Next, a third indicator 312 can provide an indication of an electrical problem. When a circuit breaker 326 does not experience a trip or break in the flow of electrical current, the third indicator 312 provides a positive indication, such as illuminating a LED. Typically, a positive indication is feedback to a user that a sufficient amount or predetermined amount of electrical current is being transmitted to the circuit breaker 304 from the transformer 328 through the input cord 302 from the electrical source 316. If a trip or break in the flow of electrical current is experienced by the circuit breaker 326, the third indicator 312 provides a negative indication, such as not illuminating a LED. Typically, a negative indication is feedback that that an overcurrent condition exists in the housing 304. If a sufficient amount of electrical current is detected by the first indicator 310 and second indicator 310, but the third indicator provides a negative indication, then the transformer 328 could be faulty.

When an output cord 306 is connected between the housing 304 and an electrically-powered device 318, a fourth indicator 314 can provide an indication of an electrical problem. Typically, a housing adapter 334 at one end of an output cord body 330 is either pre-connected to the housing 304 or manually connected to the housing 304 via a corresponding socket opening associated with the housing 304. A device socket plug 332 at the opposing end of the output cord body 330 is engaged to a corresponding socket associated with the electrically-powered device 318. When electrical current is detected by the fourth indicator 314, the fourth indicator 314 provides a positive indication, such as illuminating a LED. Typically, a positive indication provides feedback that a sufficient amount or predetermined amount of electrical current is being transmitted through the output cord 306 from the housing 304 towards the electrically-powered device 318. If no electrical current is detected by the fourth indicator 314, then the fourth indicator 314 provides a negative indication, such as not illuminating a LED. Typically, a negative indicator provides feedback that an insufficient amount or no electrical current is being transmitted through the output cord 306 from the housing 304 toward the electrically-powered device 318, and the output cord 306 could be faulty.

When the electrical source 316 provides an electrical current to the system 300, the electrical current flows from the electrical socket plug 322 towards the electrically-powered device 318. If the input cord 302, housing 304, and output cord 306 receive sufficient amounts or predetermined amounts of electrical current, the electrically-powered device 318 will receive a usable electrical current through the output cord 306.

If power to the electrically-powered device is interrupted, a user can check the indicators 308–314 to immediately determine the source of the problem. If there is an electrical problem with any of the components, one or more of the indicators 308–314 will isolate the electrical problem in the respective component. By analyzing the indicators 308–314 for their respective positive and/or negative indications, an electrical problem in a component may be isolated, diagnosed, or otherwise identified. Thus, when a component receives a sufficient amount or predetermined amount of electrical current, a respective indicator indicates that electrical current is being transmitted through the component. Vice-versa, if a component receives an insufficient amount or no electrical current, a respective indicator indicates that a problem could exist.

One skilled in the art will recognize the applicability of the invention to other types of power supply devices with one or more component parts such as input cords, output cords, intermediate cords, or other power transmission components. Indicators may be adapted to mount to each or all of the component parts of a power supply system to assist a user in isolating, diagnosing, or otherwise identifying an electrical problem in one or more component parts of a power supply system. Prevention in the misdiagnosis of power problems in a power pack or power supply system, and the rapid identification of specific problems in component parts of the power pack or power supply system will lead to cost reductions in shipping and replacement component parts for the vendor.

Figure 4:
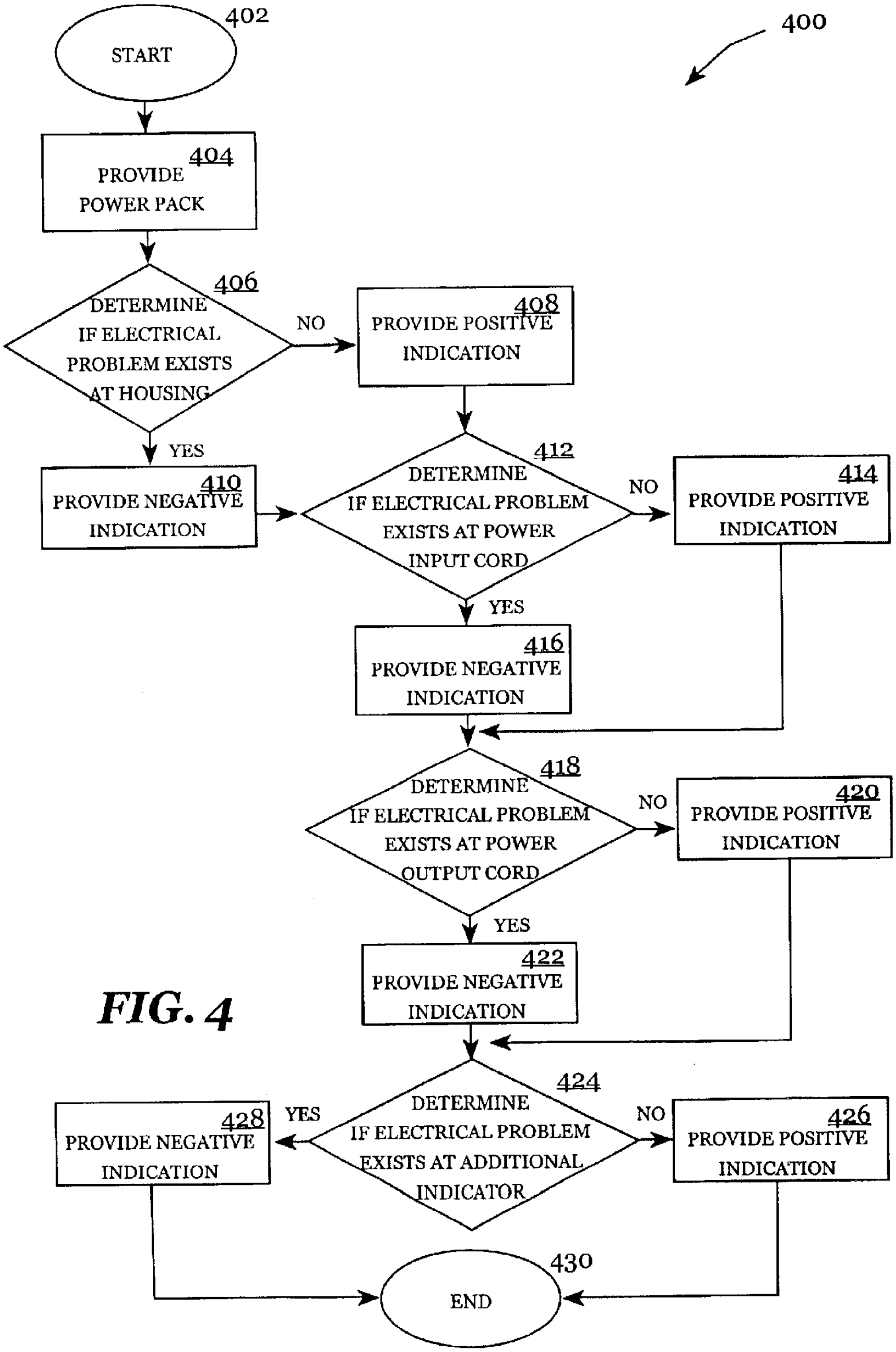
FIG. 4 is a flowchart diagram of a method in accordance with various embodiments of the invention.

FIG. 4 is a flowchart diagram of a method in accordance with various embodiments of the invention. The method 400 begins at 402. 402 is followed by 404, in which a power pack 300 is provided. Typically, the power pack includes a housing 304, a power input cord 302, a power output cord 306, and a series of indicators 308–310, 314. The housing 304 includes at least an indicator 310. The power input cord 302 includes another indicator 308. The power output cord 306 includes yet another indicator 314. In some instances, the housing may include yet another indicator 312. Other quantities of indicators as well as respective component parts for a power pack can be used with this method 400.

404 is followed by decision block 406, in which a determination is made of whether an electrical problem is detected at the housing 310. Generally, the indicator 310 detects the presence of an electrical problem adjacent to the housing. For example, the indicator 310 can be a LED that detects whether a sufficient amount or predetermined amount of electrical of electrical current is flowing from the power input cord 302 to the housing 310.

If no electrical problem is detected at decision block 406, then the "NO" branch is followed to 408. At 408, the indicator 310 provides an indication of no electrical problem. Typically, a positive indication is provided to a user, indicating that there is sufficient electrical current or a predetermined amount of electrical current is received from the power input cord 302 by the housing 304. 408 is followed by decision block 412.

If an electrical problem is detected at decision block 406, then the "YES" branch is followed to 410. In 410, the indicator 310 provides an indication of the electrical problem. Typically, a negative indication is provided to a user, indicating that there is insufficient electrical current or a predetermined amount of electrical current is not being received from the power input cord 302 by the housing 304. This negative indication could indicate a faulty power input cord 302.

410 is followed by decision block 412, in which a determination is made of whether an electrical problem is detected at the power input cord 302. Generally, the indicator 308 detects the presence of an electrical problem. For example, the indicator 308 can be a LED that detects whether a sufficient amount or predetermined amount of electrical of electrical current is flowing from the electrical source 316 to the power input cord 302.

If no electrical problem is detected at decision block 412, then the "NO" branch is followed to 414. At 414, the indicator 308 provides an indication of no electrical problem. Typically, a positive indication is provided to a user, indicating that there is sufficient electrical current or a predetermined amount of electrical current is received from the electrical source 316 by the power input cord 302. 414 is followed by decision block 418.

If an electrical problem is detected at decision block 412, then the "YES" branch is followed to 416. In 416, the indicator 308 provides an indication of the electrical problem. Typically, a negative indication is provided to a user, indicating that there is insufficient electrical current or a predetermined amount of electrical current is not being received from the electrical source 316 by the power input cord 302. In this instance, the negative indication could indicate a fault in the electrical source 316. 416 is followed by decision block 418.

At decision block 418, a determination is made of whether an electrical problem is detected at the power output cord 306. Generally, the indicator 314 detects the presence of an electrical problem. For example, the indicator 314 can be a LED that detects whether a sufficient amount or predetermined amount of electrical of electrical current is flowing from the housing 304 to the power output cord 306.

If no electrical problem is detected at decision block 418, then the "NO" branch is followed to 420. At 420, the indicator 314 provides an indication of no electrical problem. Typically, a positive indication is provided to a user, indicating that there is sufficient electrical current or a predetermined amount of electrical current is received from the housing 304 by the power output cord 306. 420 is followed by 424.

If an electrical problem is detected at decision block 418, then the "YES" branch is followed to 422. In 422, the indicator 314 provides an indication of the electrical problem. Typically, a negative indication is provided to a user, indicating that there is insufficient electrical current or a predetermined amount of electrical current is not being received from the housing 304 by the power output cord 306. A negative indication indicates a potential fault with the power output cord 306. 422 is followed by 424.

In the instance when there are only three indicators in a power pack system, the method 400 would typically end at 424. In the instances where more than three indicators are used with a power pack, the method 400 can include the additional steps 424–428 as described below.

At 424, a determination is made whether an electrical problem exists at a location associated with an additional indicator. For example, the indicator 312 detects the presence of an electrical problem with the circuit breaker 326. The indicator 312 can be a LED that detects whether sufficient amount or predetermined amount of electrical of electrical current is flowing to a particular component part of the power pack. Alternatively, the indicator 312 may be associated with the circuit breaker 326 mounted to the housing 304. The indicator 312 may be a LED that indicates the presence of an electrical problem detected by the circuit breaker 326.

If no electrical problem is detected at 424, then the "NO" branch is followed to 426. At 426, the additional indicator 312 provides an indication of no electrical problem. Typically, a positive indication is provided to a user, indicating that there is sufficient electrical current or a predetermined amount of electrical current is received by the additional indicator 312, or alternatively, by a component part associated with the additional indicator 312. 426 is followed by 430.

If an electrical problem is detected at 424, then the "YES" branch is followed to 428. In 428, the additional indicator 312 provides an indication of the electrical problem. Typically, a negative indication is provided to a user, indicating that there is insufficient electrical current or a predetermined amount of electrical current is not being received by the additional indicator 312, or alternatively, by a component part associated with the additional indicator 312. 428 is followed by 430.

At 430, the method 400 ends. 424–428 may be repeated as necessary if additional indicators exist.

While the above description contains many specifics, these specifics should not be construed as limitations on the scope of the invention, but merely as exemplifications of the disclosed embodiments. Those skilled in the art will envision many other possible variations that within the scope of the invention as defined by the claims appended hereto.

The invention I claim is:

1. A system for isolating an electrical problem in a power pack, including:

a power pack, comprising, an input cord including at least a first indicator, wherein the input cord is adapted to receive electrical current from an electrical source, and further adapted to transmit the electrical current to the power pack, and wherein the first indicator indicates when the input cord transmits electrical current from the electrical source;

a housing including at least a second indicator, wherein the second indicator indicates when the power pack receives electrical current from the input cord; and a device cord adapted to conduct electrical current from the power pack to an electrically-powered device, the device cord including at least a third indicator, wherein the third indicator indicates when the power pack transmits electrical current through the device cord.

2. The system of claim 1, wherein the power pack further comprises a circuit breaker with a fourth indicator, wherein the fourth indicator indicates when the circuit breaker detects an overcurrent condition.

3. The system of claim 2, wherein the circuit breaker is a ground fault interrupter circuit.

4. The system of claim 1, wherein the power pack further comprises a transformer adapted to transform electrical current to a usable electrical current for an electrically-powered device.

5. The system of claim 1, wherein the first indicator, second indicator, and third indicator include at least one light emitting diode (LED).

6. The system of claim 2, wherein the fourth indicator includes at least one light emitting diode (LED).

7. The system of claim 1, wherein the input cord further comprises an input plug with a plug body, and the first indicator is incorporated in the plug body of the input plug.

8. The system of claim 1, wherein the device cord further comprises an output plug with a plug body, and the third indicator is incorporated in the plug body of the output plug.

9. A method for isolating an electrical problem in a power system with a power pack, comprising:

providing a power pack, including, a housing including at least a first indicator;

a power input cord including at least a second indicator;

a power output cord including at least a third indicator;

in the event of an electrical problem in the housing, providing an indication of the problem with the first indicator;

in the event of an electrical problem in the power input cord, providing an indication of the electrical problem with the second indicator; and in the event of an electrical problem in the power output cord, providing an indication of the electrical problem with the third indicator.

10. The method of claim 9, wherein the power pack further comprises a circuit breaker with a fourth indicator, wherein the fourth indicator indicates when the circuit breaker detects an overcurrent condition.

11. The method of claim 10, wherein the circuit breaker is a ground fault interrupter circuit.

12. The method of claim 9, wherein the power pack further comprises a transformer adapted to transform electrical current to a usable electrical current for an electrically-powered device.

13. The method of claim 9, wherein the first indicator, second indicator, and third indicator include at least one light emitting diode (LED).

14. The method of claim 10, wherein the fourth indicator includes at least one light emitting diode (LED).

15. The method of claim 9, wherein the input cord further comprises an input plug with a plug body, and the first indicator is incorporated in the plug body of the input plug.

16. The method of claim 9, wherein the device cord further comprises an output plug with a plug body, and the third indicator is incorporated in the plug body of the output plug.

17. A combination power light coding apparatus for identifying the location of an electrical problem in a power pack, comprising:

a housing for transforming electrical current for use by a peripheral device, wherein the housing includes an first indicator providing an indication of whether electrical current is received by the housing;

an input power cord adapted to transmit electrical current to the housing, wherein the input power cord includes a second indicator providing an indication of whether electrical current is received by the input power cord; and an output power cord adapted to transmit power from the housing to the peripheral device, wherein the output power cord includes a third indicator providing an indication of whether electrical current is received by the output power cord.

18. The apparatus of claim 17, wherein the first indicator, second indicator, and third indicator are each adapted to provide a positive feedback if a sufficient amount of electrical current is detected by the respective indicator, and further adapted to provide a negative feedback if an insufficient amount of electrical current is detected by the respective indicator.

19. The apparatus of claim 17, further comprising a circuit breaker with a fourth indicator, wherein the fourth indicator provides an indication of whether the circuit breaker is tripped.

20. The apparatus of claim 17, wherein the first indicator, second indicator, and third indicator each operate independently of the indication provided by one or more of the other indicators.

* * * * *